A. ADAMS.
Corn Sheller.
No. 2,205.
Reissued March 20, 1866.
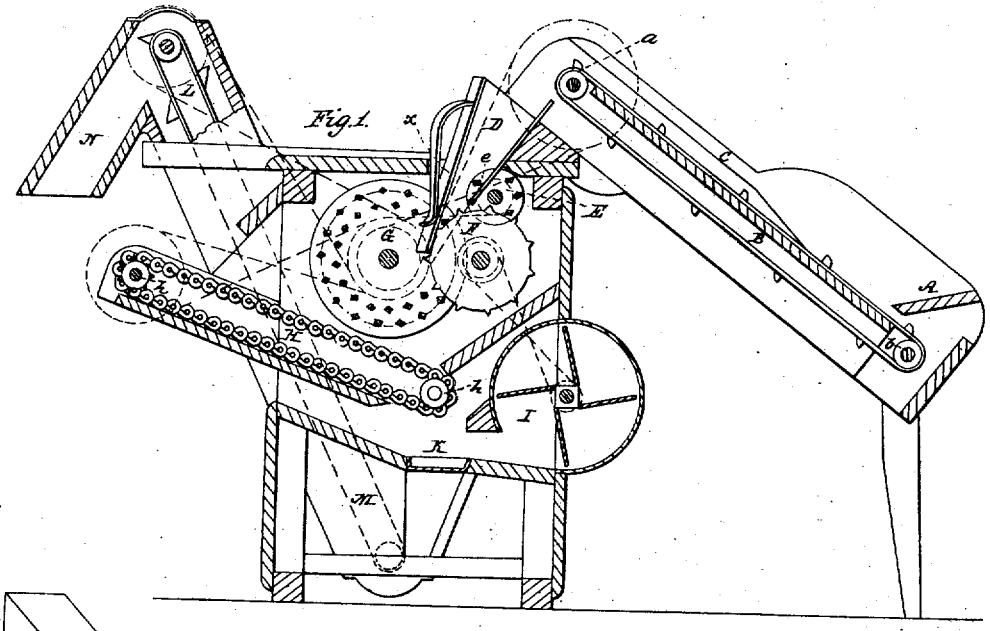
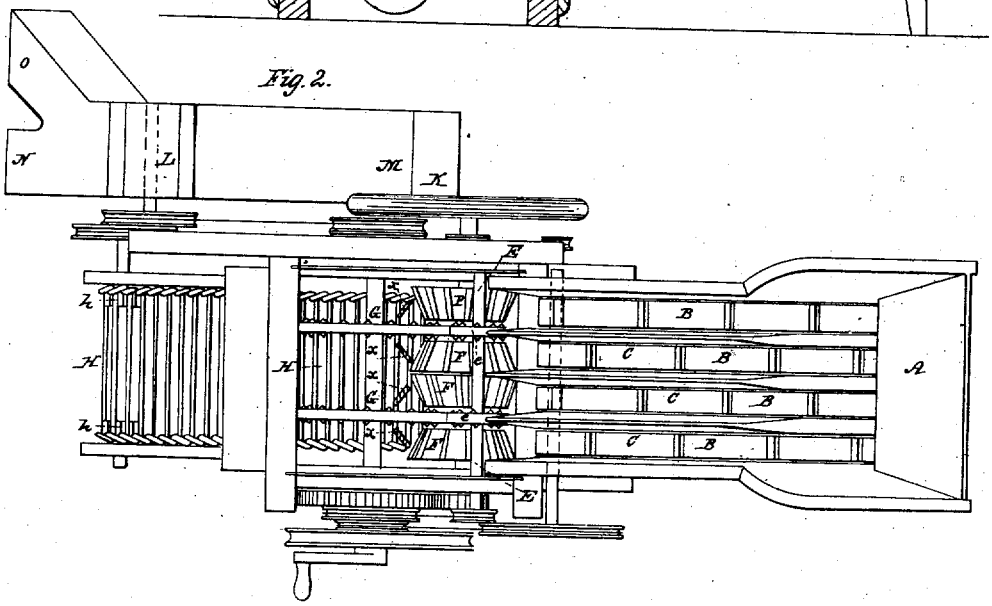
Witnesses:
Wm. Cumble Hall
William Jacobus
Inventor:
Augustus Adams
By his atty
Amos Brewing
N. PETERS, Photo-Lithographer, Washington, D. C.

UNITED STATES PATENT OFFICE.

AUGUSTUS ADAMS, OF SANDWICH, ILLINOIS.

IMPROVEMENT IN CORN-SHELLERS.

Specification forming part of Letters Patent No. 32,971, dated August 6, 1861; Reissue No. 2,205, dated March 20, 1866.

*To all whom it may concern:*

Be it known that I, AUGUSTUS ADAMS, of Sandwich, in the county of De Kalb and State of Illinois, have invented a new and useful Improvement in Corn-Shelling Machines; and I do hereby declare and make known that the following is a full, clear, and exact description of the same, reference being had to the accompanying drawings, and the letters and figures marked thereon, which form part of this specification.

My said invention relates to that class of corn-shelling machines in which several ears of corn are intended to be delivered simultaneously and separately between the shelling devices appropriate to each by the automatic action of the machine itself; and my object is, first, to cause the ears of corn, as they are carried up into the machine by a suitable conveyer from a hopper into which they are indiscriminately thrown, to ascend endwise upon said conveyer, and so be delivered endwise and singly, or one at a time, each into its appropriate throat or entrance-passage into the machine; and, second, to prevent the accumulation of the ears from any cause at that point where they pass from said throats or entrances between the shelling surfaces or wheels, which would otherwise choke up and seriously impede the operation of the machine.

To the aforesaid ends, therefore, my invention consists, first, in the arrangement, in combination with the aforesaid conveyer or series of belts for carrying the corn into the machine, of a series of longitudinal partitions rising up between said conveying-belts, forming passages wide enough to allow ears of corn to pass up endwise, and being so constructed as to cause the ears to fall back into the hopper whenever they may from any cause commence their ascent in any other than an endwise position between the aforesaid partitions; and, second, in the arrangement, in combination with the feeding throats or passages before mentioned, and the shelling devices of the machine, of auxiliary or picker wheels, operating to draw the ears forward into the machine and prevent its choking or clogging up whenever from any cause two or more ears should enter said passages or either of them at the same time.

To enable those skilled in the art to understand fully how to construct and use my said invention, I will proceed to describe its construction and operation, making reference in so doing to the aforesaid drawings, in which—

Figure 1 represents a side sectional elevation of my invention; and Fig. 2 is a plan or top view of the same, the cover being removed to show the interior parts.

The same letters of reference in the different figures denote like parts of my invention.

The machine represented in the drawings is provided with four separate feeding-throats and appropriate shelling-surfaces, being designed to shell four ears of corn simultaneously; but it may obviously be constructed with a greater or less capacity, as desired, without departing from the principle of my invention.

The operating parts of the machine are supported upon and inclosed in a suitable frame, whose nature and construction are shown with sufficient clearness in the drawings to need no special verbal description.

A represents an inclined shelf, which, together with the side walls and the conveying-belts passing up beneath the same, as shown, forms a receiving-hopper, upon or into which the ears of corn may be thrown or shoveled in bulk, without reference to any special arrangement.

B represents four narrow endless belts arranged side by side, passing up under the hopper A, and being supported and moved around upon suitable drums or pulleys, (marked *a b*,) as shown. Each of the said belts is provided with a series of transverse cleats or buckets, (marked *d*,) whose distance apart is sufficient to allow an ear of corn to lie endwise upon the belt between them, which serve to convey the ears up into the shellers as the belts are revolved in the proper direction. Between the said belts are arranged the partitions marked C, which do not rise above the plane of the belts at their lower end, but rise gradually above said plane until, at a point about half way up the ascent, they rise above the cleats *d* upon said belts or even with their upper edges, as is clearly shown in Fig. 1.

Instead of having four separate belts, a single belt of sufficient width may be used, having partitions C arranged over the same, dividing it into narrow passages, and having short cleats arranged thereupon in such a manner as to traverse said passages as before, which arrangement would operate in precisely the same manner as the one before described.

The operation of this feature of my invention is as follows: The conveyers and machine being set in motion, the corn is thrown or shoveled in upon the hopper A, and the cleats by their continuous ascent take the ears of corn and carry them up. If the ears arrange themselves endwise upon the said belts, they are at once carried up and delivered endwise into the shellers, as desired and as hereinafter described; but if the ears arrange themselves transversely or in an oblique position with respect to the said conveying-belts, although they may be carried up for a short distance in such position, yet the partitions C, operating to raise them gradually up from the belts, raise them also above the cleats upon which they rest at the point where the said partitions rise to a level with the upper edges of said cleats, when the ears at once fall back toward the bottom, and, from the fact that one end is heavier or larger than the other and descends more rapidly, generally arrange themselves endwise upon the belts, as desired, and are then carried up and delivered into the machine, it being utterly impossible for an ear of corn to accomplish the ascent in any other position.

While it is essential in this arrangement that the partitions shall rise even with the upper edges of the cleats on the conveying-belts at some point of the ascent, it is equally essential to the successful operation of the machine that said partitions shall not rise above the same, or the belts at the lower end thereof, where the corn is thrown or placed upon the conveyer, for in such a case those ears that might arrange themselves transversely or obliquely with respect to the belts would rest upon the said partitions and keep not only such ears themselves, but all superincumbent ones, away from the action of the conveyer, thus defeating the object and purpose of the machine.

The upper edges of the partitions C may be beveled off, as shown, if desired, to facilitate the adjustment of the ears in a longitudinal position between them when being carried up in an oblique position, but I do not regard this as essential or very important.

As the corn reaches the upper end of the conveyer, the ears are delivered endwise, each into the throat D, corresponding with the belt upon or passage in which it was brought up, which throats lead into appropriate shelling devices consisting of the conical ribbed and spurred wheels, (marked F G in the drawings.)

By the operation of the conveying-belts above described, the ears of corn are carried forward with great regularity and rapidity, and if there be any delay of one ear in passing from the throat into the shelling devices of the machine, another ear following it is extremely liable to become lodged or wedged in with it, and so choke up the said throats, when the attendant must stop the feeding portion of the machine and clear out said throats and remove the ears. To obviate this difficulty, I employ the device hereinafter described.

E represents a shaft passing across the machine near the lower end of the series of feeding-throats D, having suitable bearings in the frame of the machine and being revolved by suitable gearing or belting, as shown. Upon said shaft and revolving with it are arranged a suitable number of wheels, (marked *e* in the drawings,) both sides of which are provided with suitable teeth, which project laterally into the said throats, as shown. By this arrangement it will be seen that these wheels present one side in each of the throats D, so that when two or more ears may be wedged in the throats, as aforesaid, the action of said wheels, revolving in the direction in which the ears are to pass, will draw or force one of the ears forward into the shelling devices, and thus clear out and keep the said throats unchoked automatically. As many of these auxiliary or feeding wheels may be used as desired, and each throat may be provided with wo, one arranged upon each side, which arangement will operate more effectually than where only one wheel is used in each throat.

There are suitable springs, (marked *f* in the drawings,) which hold the ears of corn in contact with the shelling-wheels until the same are thoroughly shelled, being so arranged as to hold the ears in such a position that the operation of the machine gives them a rolling motion between the shelling surfaces.

H represents a cob-rake or conveyer, made wholly of wire, which carries away the cobs and discharges them from the machine, as shown. The air-blast from the fan I is delivered beneath the lower end of the cob-carrier and passes out beneath the partition arranged beneath it. The shelled corn falls down through the aforesaid air-blast, which removes all light foreign substances therefrom, into an inclined spout, (marked K,) which delivers it into the elevator L M, which delivers the same into a suitable spout, whence it is discharged into bags or bins.

The drawings represent a double delivery-spout, consisting of two branches, (marked respectively N and O,) whereby bags or barrels may be alternately filled without stopping the machine or accumulating the grain in the elevator.

Having described the nature, construction, and operation of my invention, I will now specify what I claim and desire to secure by Letters Patent—

1. In combination with a series of conveying-belts, B, or their equivalent, provided with cleats or buckets, as described, the employment of a series of widening partitions, C, arranged and operating substantially as and for the purposes herein specified and shown.

2. In combination with a series of passages formed upon the conveying-belts, or their equivalent, by the described arrangement of the partitions C, the arrangement of a corresponding series of separate feeding throats or passages D, leading down into the hopper to the shellers, whereby the ears of corn are kept separate and delivered endwise into the said shellers, substantially as described and shown.

3. In combination with a series of separate feeding-throats in the hopper of a corn-shelling machine, into which the ears are delivered endwise, as described, and the shelling wheels or surfaces thereof, the employment of a series of pickers or feeding-wheels, E, or their equivalent, arranged and operating substantially as and for the purposes shown and set forth.

AUGUSTUS ADAMS.

Witnesses:
W. E. MAUS,
I. W. HERTHLE.